United States Patent
Hao et al.

(10) Patent No.: US 9,454,655 B2
(45) Date of Patent: Sep. 27, 2016

(54) CREATION OF RHYTHMIC PASSWORD AND AUTHENTICATION BASED ON RHYTHMIC PASSWORD

(75) Inventors: Chen Hao, Beijing (CN); Guoqiang Hu, Beijing (CN); Qi Cheng Li, Beijing (CN); Li Jun Mei, Beijing (CN); Jian Wang, Beijing (CN); Yi Min Wang, Beijing (CN); Zi Yu Zhu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 194 days.

(21) Appl. No.: 13/598,877

(22) Filed: Aug. 30, 2012

(65) Prior Publication Data

US 2013/0055381 A1 Feb. 28, 2013

(30) Foreign Application Priority Data

Aug. 31, 2011 (CN) .......................... 2011 1 0253933

(51) Int. Cl.
G06F 21/31 (2013.01)
G06F 21/36 (2013.01)
G06F 21/34 (2013.01)
G06F 21/46 (2013.01)
G06F 21/32 (2013.01)

(52) U.S. Cl.
CPC ............. G06F 21/316 (2013.01); G06F 21/32 (2013.01)

(58) Field of Classification Search
CPC ............ H04L 9/00; H04L 9/32; H04L 17/30
See application file for complete search history.

(56) References Cited

U.S. PATENT DOCUMENTS

| 4,805,222 | A  | * | 2/1989  | Young et al. ................. 382/115 |
| 6,954,862 | B2 |   | 10/2005 | Serpa |
| 7,440,889 | B1 | * | 10/2008 | Skiena et al. ..................... 704/9 |
| 7,509,686 | B2 |   | 3/2009  | Checco |
| 8,489,635 | B1 | * | 7/2013  | Phoha et al. .................. 707/781 |
| 8,533,486 | B1 | * | 9/2013  | Stark et al. ................... 713/186 |

(Continued)

FOREIGN PATENT DOCUMENTS

CN 101772015 A 7/2010

OTHER PUBLICATIONS

BioPassword, "Authentication Solutions through Keystroke Dynamics" BioPassword, Inc., http://www.infosecurityproductsguide.com/technology/2007/BioPassword_Authentication_Solutions_Whitepaper_FINAL.pdf.

(Continued)

*Primary Examiner* — Andrew Nalven
*Assistant Examiner* — Huan V Doan
(74) *Attorney, Agent, or Firm* — Scully, Scott, Murphy & Presser, PC; Jennifer Davis, Esq.

(57) ABSTRACT

A method and system for utilizing the biometric factors reflected in the typing as a kind of physiological password, to create a rhythmic password specific to the user, and to authenticate based on the rhythmic password. The method includes providing an original training text to a user, receiving an input training text provided by the user according to the original training text, extracting rhythmic characteristic values between adjacent text units of the input training text, and generating a rhythmic password of the user based on the extracted rhythmic characteristic values between adjacent text units. The invention utilizes the rhythm of a user inputting text can bring multiple advantages, including enhanced security of the password, and saving the user's cost of memorizing the password.

18 Claims, 6 Drawing Sheets

(56) References Cited

U.S. PATENT DOCUMENTS

| | | | |
|---|---|---|---|
| 2004/0162999 A1 | 8/2004 | Schreiber et al. | |
| 2004/0187037 A1* | 9/2004 | Checco | 713/202 |
| 2006/0271790 A1* | 11/2006 | Chen | 713/185 |
| 2006/0280339 A1* | 12/2006 | Cho | 382/115 |
| 2008/0133933 A1* | 6/2008 | Bender | 713/186 |
| 2009/0150992 A1* | 6/2009 | Kellas-Dicks et al. | 726/19 |

OTHER PUBLICATIONS

English Abstract of CN101557287 (A).
English Abstract of CN101478401 (A).

* cited by examiner

CREATION OF RHYTHMIC PASSWORD AND AUTHENTICATION BASED ON RHYTHMIC PASSWORD

CROSS-REFERENCE TO RELATED APPLICATION

This application claims priority under 35 U.S.C. §119 from Chinese Patent Application No. 201110253933.8 filed Aug. 31, 2011, the entire contents of which are incorporated herein by reference.

BACKGROUND OF THE INVENTION

1. Field of the Invention

This invention generally relates to data processing, and particularly to a method and apparatus for creating a rhythmic password, and a method and apparatus for authenticating based on a rhythmic password.

2. Description of Related Art

Setting password data in the form of text is currently the most common way of authentication. However, a text password, due to its limitation, has many drawbacks, such as poor security, easy to be forgotten, strict requirement for input accuracy, etc.

To further enhance the security of a text password, it has been proposed in the prior art to further add a rhythmic password to the text password to perform the second encryption. Referring to the U.S. Pat. No. 6,954,862B2, it proposes a solution to enhance a text password based on the pace, rhythm and tempo. The password in this document comprises a character string and an associated timing element. When accessing a protected device or function, the user needs to input the proper character string with the proper pace, rhythm and tempo. The input character string and timing element will be compared with stored values, and only when these values are matched can the user be allowed to access. That is to say, the user is not only required to input the proper character string, but also required to input it with the proper pace, rhythm and tempo. A simple example is: if the user's text password is 6 letters of "Z", the password including a timing element can be "ZZZ"(pause)"ZZZ", that is to say, after inputting the three letters of "Z", pausing for a while, for example, 2 seconds.

Those skilled in the art will find that although combining rhythmic information with a pure text password can enhance the security of the password, since in the prior art the password input by the user is specific both in text and in rhythm, others can still memorize the character string and rhythmic information in the user's password by observing the process of the user inputting the password. That is to say, the design of a password in the prior art still has some limitations.

In order to enhance the security of a password, many applications require the user to change the password every period of time (e.g., half a year). Such a requirement although enhances the security to some extent, but also increases the user's password maintenance costs, and affects the user's experience, as frequent changing of a password is not conducive for the user to remember his password.

Existing research indicates that like a person's writing pattern can reflect his biometric factors, his typing pattern can also reflect his biometric factors to a great extent.

This invention proposes that the biometric factors reflected in typing can be utilized as a physiological password.

SUMMARY OF THE INVENTION

In a first aspect of the present invention, a method for creating a rhythmic password is provided. The method includes providing an original training text to a user, receiving an input training text provided by the user according to the original training text, extracting rhythmic characteristic values between adjacent text units of the input training text, and generating a rhythmic password of the user based on the extracted rhythmic characteristic values between adjacent text units.

In a second aspect of the invention, a method for authenticating based on a rhythmic password is provided. The method includes generating an original authentication text for a user, receiving an input authentication text provided by the user according to the original authentication text, extracting the rhythmic characteristic values between adjacent text units in the input authentication text, comparing the extracted rhythmic characteristic values between adjacent text units with a rhythmic password of the user, and determining whether the user is authenticated successfully with the rhythmic password according to the comparison result.

In a third aspect of the invention, a system for creating a rhythmic password is provided. The system includes means configured to provide an original training text to a user; first receiving means configured to receive an input training text provided by the user according to the original training text, first extracting means configured to extract rhythmic characteristic values between adjacent text units of the input training text, and generating means configured to generate a rhythmic password of the user based on the extracted rhythmic characteristic values between adjacent text units.

In a fourth aspect of the invention, a system for authenticating based on a rhythmic password is provided. The system includes a generating apparatus configured to generate an original authentication text for a user, second receiving means configured to receive an input authentication text provided by the user according to the original authentication text, second extracting means configured to extract rhythmic characteristic values between adjacent text units in the input authentication text, comparing means configured to compare the extracted rhythmic characteristic values between adjacent text units with a rhythmic password of the user, and first determining means configured to determine whether the user is authenticated successfully with the rhythmic password according to the comparison result.

Using the rhythm of a user inputting text as a password can bring many advantages, including enhancing the password security, and saving the user's cost of memorizing the password. Specific implementation of the above and other advantages will be described in more detail in conjunction with specific embodiments in the section of detailed description of specific embodiments below.

BRIEF DESCRIPTION OF DRAWINGS

The accompanying drawings referred to in the description are only used for illustrating typical embodiments of the present invention, and should not be construed as limitation to the scope of the present invention.

DETAILED DESCRIPTION OF THE PREFERRED EMBODIMENTS

Figure 1:
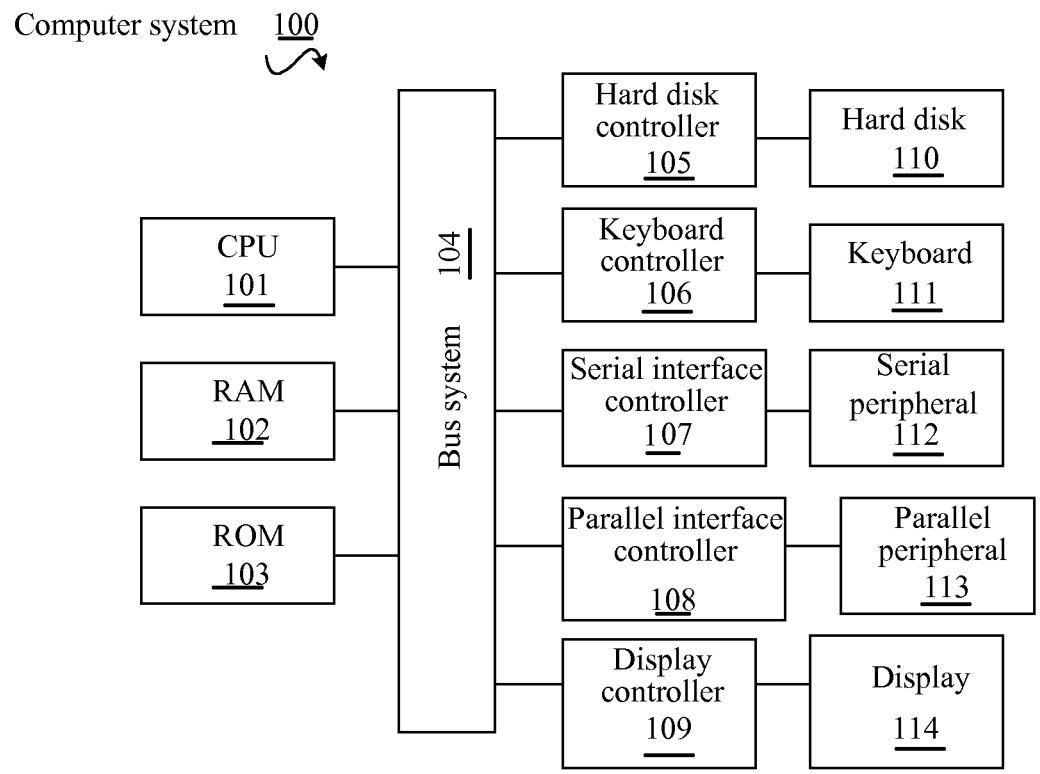
FIG. 1 illustrates a block diagram of an exemplary computing system 100 suitable for realizing embodiments of the present invention.

The terminology used herein is for the purpose of describing particular embodiments only and is not intended to be unduly limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the form disclosed. Many modifications and variations will be apparent to those of ordinary skill in the art. The embodiment was chosen and described in order to best explain the principles and the practical application, and to enable others of ordinary skill in the art to understand various embodiments of the invention with various modifications as are suited to the particular use contemplated.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in any tangible medium of expression having computer-usable program code embodied in the medium.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

The computer readable signal medium can include a propagated data signal with the computer-usable program code embodied therewith, either in baseband or as part of a carrier wave. The propagated signal can be in various forms, including but not limited to, electromagnetic signals, optical signals, or any suitable combination of the foregoing. The computer readable signal medium can be any computer readable medium that is not a computer readable storage medium, but that can transmit, propagate or transport a program for use by or in connection with an instruction execution system, apparatus or device.

The program code embodied in the computer readable medium can be transmitted using any appropriate medium, including but not limited to wireless, wireline, optical fiber cable, RF, etc, or any suitable combination of the foregoing.

Computer program code for carrying out operations in embodiments of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure are described with reference to the flowchart illustrations and/or block diagrams of the methods, apparatus (systems) and computer product. It will be understood that, each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 schematically shows a structural block diagram of a computing device that can realize an embodiment of the present invention. The computer system shown in FIG. 1 comprises CPU (central processing unit) 101, RAM (random access memory) 102, ROM (read-only memory) 103, system bus 104, hard disc controller 105, keyboard controller 106, serial interface controller 107, parallel interface controller 108, display controller 109, hard disc 110, keyboard 111, serial peripheral device 112, parallel peripheral device 113 and display 114. In these components, CPU 101, RAM 102, ROM 103, hard disc controller 105, keyboard controller 106, serial interface controller 107, parallel interface controller 108 and display controller 109 are connected with system bus 104. Hard disc 110 is connected with hard disc controller 105; keyboard 111 is connected with keyboard controller 106; serial peripheral device 112 is connected with serial interface controller 107; parallel peripheral device 113 is connected with parallel interface controller 108, and display 114 is connected with display controller 109. It is to be understood that the block diagram of FIG. 1 is presented only for the purpose of illustration, rather than limitation to the scope of the present disclosure. In some situations, some devices can be added or removed as required by specific conditions.

Figure 2:
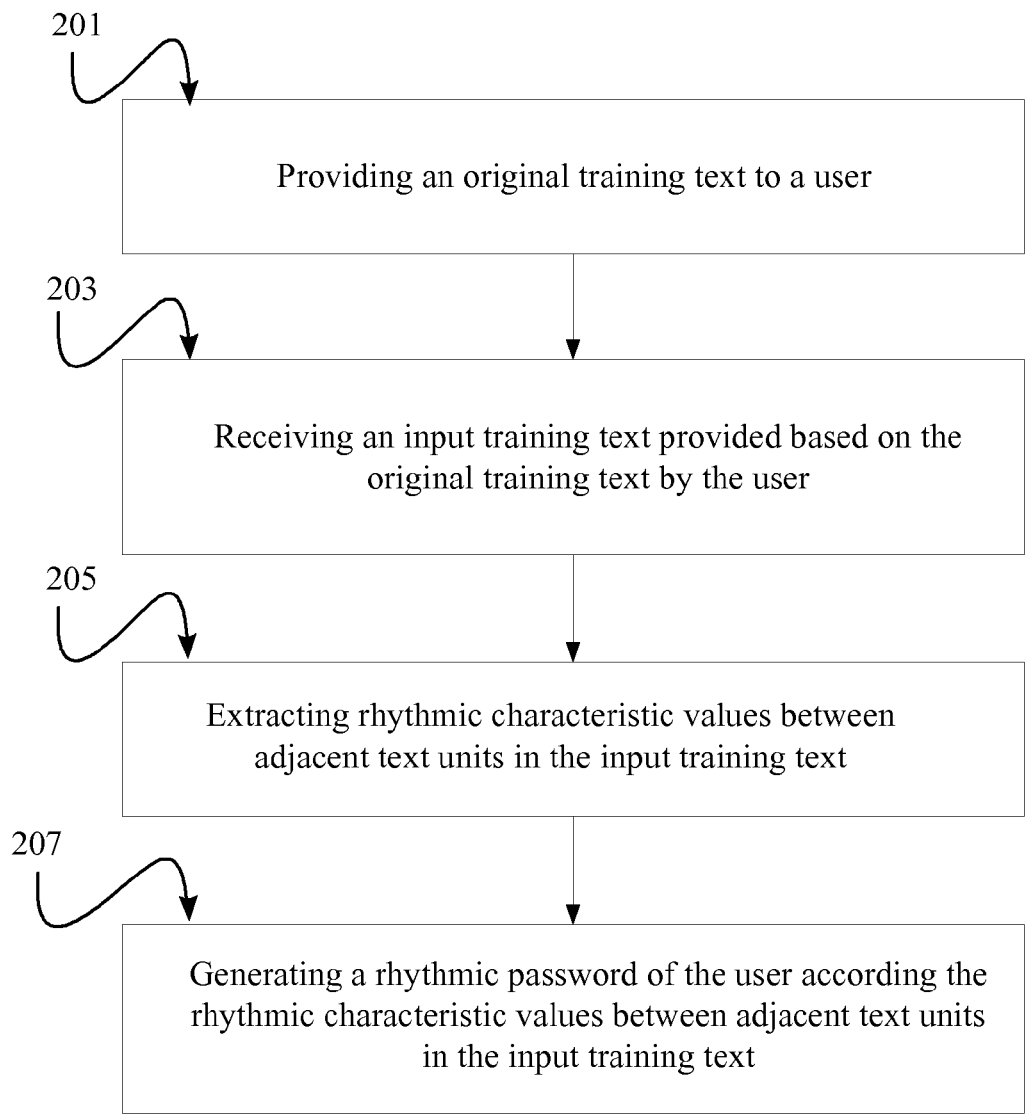
FIG. 2 illustrates a flow diagram of a method for creating a rhythmic password according to an embodiment of the present invention.

FIG. 2 illustrates flow diagram of a method for creating a rhythmic password according to an embodiment of the present invention. In step 201, an original training text, such as, "a bird is flying away from the tree" is provided to the user. The user will input according to the original training text. In step 203, the input training text provided by the user according to the original training text is received, such as, by the user typing "a bird is flying away from the tree" through a keyboard in his own rhythm. In step 205, rhythmic characteristic values between adjacent text units in the input training text are extracted. In step 207, a rhythmic password of the user is generated according the rhythmic characteristic values between adjacent text units in the input training text.

According to an embodiment of the present invention, the rhythmic characteristic values are time intervals between adjacent text units.

According to an embodiment of the present invention, step 207 further comprises: recording the time intervals between adjacent text units as the rhythmic password of the user. Refer to table 1 below.

TABLE 1

| | "a" | "b" | "c" | "d" | ... | "x" | "y" | "z" | "_" |
|---|---|---|---|---|---|---|---|---|---|
| "a" | | | | | | | | | 0.3 |
| "b" | | | | | | | | | 0.1 |
| "c" | | | | | | | | | |
| "d" | | | | | | | | | |
| ... | | | | | | | | | |
| "x" | | | | | | | | | |
| "y" | 0.05 | | | | | | | | |
| "z" | | | | | | | | | |
| "_" | 0.1 | | | 0.2 | | | 0.05 | | |

Table 1 is a table of 28×28, wherein the rows and columns are symmetrical, with the first row and the first column storing the 26 English letters plus a blank"_". Table 1 has 729 cells in total. The number 0.1 stored in the cell at the intersection of column "a" and row "_" represents that in the rhythmic password of the user, the time interval of the user's typing between a text unit "a" and a text unit "_" is 0.1 second. For example, assuming that originally in the user's password no data is filled, afterwards, an original training text "a bird is flying away from the tree" is provided to the user, the user types accordingly on the keyboard, then the time intervals between adjacent text units are recorded in table 1 to form a rhythmic password, which records the time intervals between at least two adjacent text units, such as the 0.1 second between "a" and "_" as described above. Further, a formula r[a][_]=0.1 can be used to denote the time interval between text units "a" and "_". After the user has typed the original training text "a bird is flying away from the tree", time intervals will be recorded in 34 cells in table 1. If more original training texts are provided to the user, more time intervals will be recorded in table 1. If a cell is already filled with a time interval, a new time interval can be averaged with the original time interval. For example, when the user continues to type according to an original training text "a little girl is crying", a new r[a][_] value (e.g., 0.2) can be obtained, and the new r[a][_] value can be averaged with the original r[a][_] value to get 0.15, and this average value can be refilled at the intersection of column "a" and row "_" in table 1.

While this embodiment is described by taking typing on a keyboard as an example, the present invention actually is not limited to typing on a common computer keyboard, but including typing on a touch screen, a keypad of a mobile phone, etc. Of course, the present invention does not preclude other input manners either.

While the present invention is described by taking English as an example, the present invention has no limitation as to the language of the text, which can be texts, numbers or characters other than English, provided only that the texts, numbers or characters can be expressed on a keyboard or other input devices.

Table 1 shows a two dimensional table, in which are recorded the time intervals between two adjacent text units.

According to another embodiment of the present invention, the rhythmic characteristic value is the total sum of the typing times of adjacent text units, which is equal to the sum of the typing times of the adjacent text units and the time interval between the adjacent text units, for example, the sum of the typing time of "a", the typing time of "_", and the time interval between "a" and "_".

According to another embodiment of the present invention, the table can be a three dimensional table, in which are recorded the time intervals between three adjacent text units. For example, for the word "boy", at the intersection of "b", "o" and "y" of three dimensions in the table can be stored the sum of the time interval between "b" and "o, and the time interval between "o" and "y". According to anther embodiment of the present invention, at the intersection of "b", "o" and "y" of three dimensions in the table can be stored the total sum of the times of typing "b", "o" and "y", which includes the time interval between "b" and "o", the time interval between "o" and "y", and the sum of the typing times of the three text units "b", "o" and "y".

According to an embodiment of the present invention, in order to save the storage amount in table 1, one text unit can not necessarily occupy one column or one row, rather, at least two text units in combination can occupy one column or one row. For example, table 1, a table of 28×28, can be reduced to a table of 11×11, as shown in table 2 below. In table 2, at the intersection of the column headed by "a/q/z" and the row headed by "w/s/x" is stored the time interval of adjacent text units when any one of the text units "a", "q" and "z" is adjacent with any one of the text units "w/s/x". Adopting the manner of table 2 can save the space and storage amount of the table, however, the granularity of password matching will become coarse accordingly. That is to say, in practical applications, the embodiment of table 1 or the embodiment of table 2 can be selected according to the requirement on security and the requirement on storage capacity.

TABLE 2

| | a/q/z | w/s/x | e/d/c | r/f/v | t/g/b | y/h/n | u/j/m | i/k | o/l/p | — |
|---|---|---|---|---|---|---|---|---|---|---|
| a/q/z | | | | | | | | | | |
| w/s/x | | | | | | | | | | |
| e/d/c | | | | | | | | | | |
| r/f/v | | | | | | | | | | |
| t/g/b | | | | | | | | | | |
| y/h/n | | | | | | | | | | |
| u/j/m | | | | | | | | | | |
| i/k | | | | | | | | | | |
| o/l/p | | | | | | | | | | |
| — | | | | | | | | | | |

In addition, while in the foregoing the present invention is illustrated mainly by taking table 1 and table 2 as an example, the present invention is not limited to recording rhythmic characteristic values between adjacent text units in a table, and the rhythmic characteristic values can be stored in other suitable structures, such as a list, a database, etc.

According to an embodiment of the present invention, step 207 further comprises matching the input training text and the original training text, and using only the rhythmic characteristic values of matched adjacent text units as the rhythmic password of the user. Matching the input training text and the original training text is to examine whether the user has provided the input training text correctly according to the original training text. In the process of the user providing the input training text through typing on a keyboard, there can occur wrong hits or miss hits. Input with theses wrong hits or miss hits can not reflect the user's typing habit accurately, thus not reflecting the user's biometric factors. Thus, in order to enhance the accuracy of a created rhythmic password, these wrong hits or miss hits can be excluded. For example, if the user types "bird" wrongly as "bid", in the table for recording the rhythmic password, the value of r[i][d] cannot be recorded (at this time, the value of r[b][i] can still be recorded, since the typing of the adjacent text units "b" and "i" is not wrong); if the user types "bird" wrongly as "bitd", in the table for recording the rhythmic password, the value of r[i][t] and the value of r[t][d] cannot be recorded. Of course, in other embodiments of the present invention, after a wrong hit or miss hit occurs, the time interval of any adjacent text units in the whole word (e.g., "bird") cannot be recorded.

Figure 3:
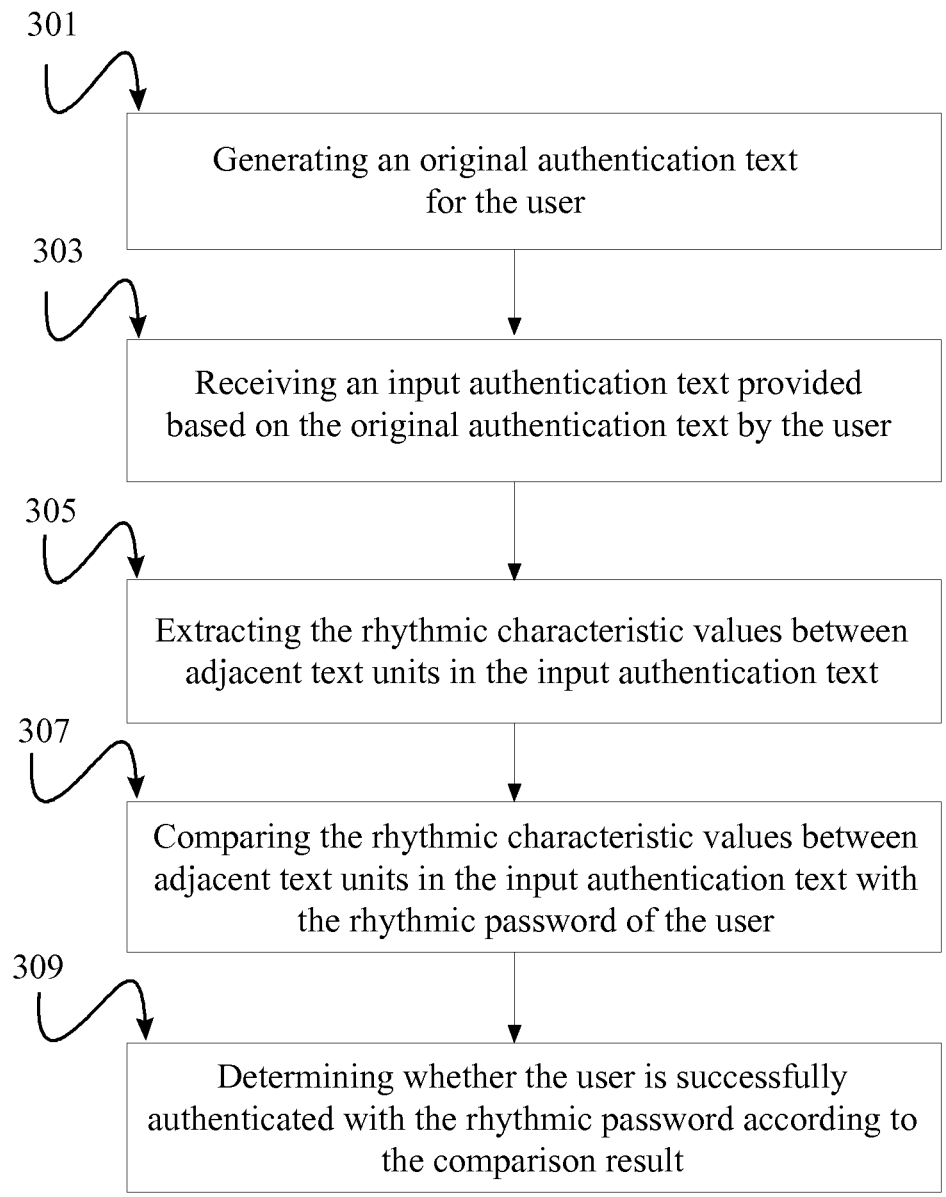
FIG. 3 illustrates a flow diagram of a method for authenticating based on a rhythmic password according to an embodiment of the present invention.

FIG. 3 illustrates a flow diagram of a method for authenticating based on a rhythmic password according to an embodiment of the present invention. In step 301, an original authentication text is generated for the user, such as displaying the sentence "a boy is crying" on a display to prompt the user to type according to the sentence. The original authentication text is the basis for the user to perform rhythmic password authentication. In the case that the table for recording the rhythmic password has sufficient data, for example, all the 27×27 cells in table 1 are filled with corresponding rhythmic passwords, or more than a percentage (e.g., 80% or 90%) of the cells in table 1 are filled with corresponding rhythmic passwords, the original authentication text cannot be selected specifically when generating the original authentication text. However, in the case that the table for recording the rhythmic password has insufficient data, for example, only a small amount of data is recorded in table 1 to represent a particular user's rhythmic password, the original authentication text needs to be selected specifically, to ensure that the generated original authentication text has a number of adjacent text units exceeding a first threshold that are recorded in the rhythmic password. The related specific steps will be described in detail below.

In step 303, an input authentication text provided according to the original authentication text by the user is received. The user can provide the input authentication text by typing on a computer keyboard, a touch screen, a keypad of a mobile phone or other input devices.

In step 305, the rhythmic characteristic values between adjacent text units in the input authentication text are extracted. In an embodiment, the rhythmic characteristic values are the time intervals between adjacent text units.

In step 307, the rhythmic characteristic values between adjacent text units in the input authentication text are compared with a rhythmic password of the user. According to an embodiment of the present invention, the rhythmic values are also represented as the time intervals between at least two text units.

In an ideal case, the contents of the input authentication text provided by the user should be completely consistent with the original authentication text. Of course, in the case of occurring miss hits or wrong hits, one or more embodiments of the present invention can still authenticate to some extent. According to an embodiment of the present invention, step 307 can further comprises matching the input authentication text and the original authentication text to determine the correctly provided adjacent text units in the input authentication text, and only when the number of the correctly provided adjacent text units in the input authentication text exceeds a second threshold (e.g., 90%) of, are performed the comparison between the rhythmic characteristic values between the adjacent text units and the rhythmic password of the user. The adjacent text units in the input authentication text that are not correctly provided are excluded from the scope of the comparison.

For example, the original authentication text "a boy is crying" has 15 text units and 14 pairs of adjacent text unit. The user types an input authentication text "a by is crying", missing the text unit "o", that is, the user has provided 14 text units in total and 13 pairs of adjacent text units, of which 12 pairs of text units are correct, but one pair of text units is wrong, for the text unit "o" is missed. In such a case, the time interval of "by" in the input authentication text cannot be compared with the value of r[b][y] in the table for recording the rhythmic password, because the time interval of the pair of text units "by" can not reflect the biometric factors of the user in a normal state. If there are too many text units that are miss hits or wrong hits, for example, two or more pairs of text units in 13 pairs of text units being wrong, the comparison is not performed, rather, the user is prompted to type once again according to the original authentication text.

According to another embodiment of the present invention, although the time interval of "by" in the input authentication text is not compared with the value of r[b][y] in the table for recording the rhythmic password, the time interval of "by" in the input authentication text can be recorded in table 1, so as to enrich the contents of the rhythmic password in table 1 as soon as possible.

In some cases, in providing an input authentication password, the user intends to type "boy", but mis-types it as "bly", then immediately aware of the mistyping, he corrects it at once, deleting "ly", and re-inputting "oy". In this case, the time interval between text unit "b" and text unit "o" will much longer than the time interval of the user typing "bo" normally. According to an embodiment of the present invention, the time interval of "bo" will not be compared.

To compare the time intervals between adjacent text units in the input authentication text with the rhythmic password, the basic method is to calculate the average of the differences between the time intervals between adjacent text units in the input authentication text and the time intervals between the adjacent text units recorded in the rhythmic password. For example, the comparison can be performed through the following formula 1:

$$e = \frac{\sum_{r'[i][j] \ne NULL} |r[i][j] - r'[i][j]|}{count} \quad \text{Formula 1}$$

Therein, r[i][j] denotes the time interval between the adjacent text units "i" and "j" in the input authentication text, r'[i][j] denotes the time interval between the adjacent text units "i" and "j" in the rhythmic password, count denotes the number of effective pairs of adjacent text units, for example, as described above, the wrongly input pairs of adjacent text units can be excluded from the scope of the comparison. e denotes the average error value between the input authentication text and the rhythmic password. The smaller value of e indicates the smaller error value, and when the value of e is smaller than a third threshold (e.g., 20 milliseconds), the authentication can be determined as successful in step 407 below.

Further, the comparison between the time intervals between adjacent text units in the input authentication text and the rhythmic password can also be performed through other formulas, for example, following formula 2:

$$e = \sqrt{\frac{\sum_{r'[i][j] \ne NULL} (r[i][j] - r'[i][j])^2}{count}} \quad \text{Formula 2}$$

Apart from above formula 1 and formula 2, the present invention does not preclude other comparison formulas. For example, the differences between the r[i][j] values in the input authentication text and the r'[i][j] values in the rhythmic password can be compared one by one, and several pairs of adjacent text units with relatively large errors can be found (e.g., the top 25% pairs of adjacent text units with the largest errors in all the text units of the input authentication text, which, in the example of "a boy is crying', are the top 4 pairs of adjacent text units), then the average e of the time intervals of these pairs of adjacent text units with those in the rhythmic password can be calculated, and if the value of e is less than a forth threshold (e.g., 30 ms), the authentication can be determined to be successful in step 407 below. Of course, the present invention does not preclude using other formulas to calculate the error value e.

According to another embodiment of the present invention, apart from the above basic comparison, other comparisons can be further added. For example, step 307 can further comprise calculating the difference between the ratio between the time intervals of two successive pairs of adjacent text units in the input authentication text units and the ratio between the time intervals of corresponding two pairs of adjacent text units recorded in the rhythmic password. For example, for the word "boy", the value of r[b][o]/r[o][y] of the user input and the value of r'[b][o]/r'[o][y] in the rhythmic password can be calculated, so that authentication of finer granularity can be performed by determining the trend of change between the two pairs of adjacent text units.

In another embodiment of the present invention, apart from the above basic comparison, step 406 can further comprise calculating the difference between the sum of the time intervals of two successive pairs of adjacent text units in the input authentication text and the sum of the time intervals of corresponding two pairs of adjacent text units recorded in the rhythmic password. Still taking the word "boy" as an example, it can be that each time the user inputs somewhat different values of r[b][o] and r[o][y], however, the sum of the value of r[b][o] and the value of r[o][y] input by the user each time can approximately the same, that is to say, the sum of the value of r[b][o] and the value of r[o][y] can reflect the biometric factors of the user to some extent. For example, in the rhythmic password, r[b][o] is 0.2, r[o][y] is 0.3, the sum of the two is 0.5. In the input authentication text typed by the user, r[b][o] is 0.3, and r[o][y] is 0.3, the sum of the two is also 0.5. In such a case, calculating the sum of the value of r[b][o] and the value of r[o][y] can correct to some extent the manner of only comparing the time intervals of two adjacent text units. The calculation of the sum of time intervals can also be applied to more than two pairs of adjacent text units (e.g., three pairs, four pairs, etc.)

In step 309, it is determined whether the user is successfully authenticated with the rhythmic password according to the comparison result. If the user has input the correct rhythmic password, this indicates a successful authentication, and the user is allowed to perform subsequent processing (e.g., log on to a web page, etc.).

Figure 4:
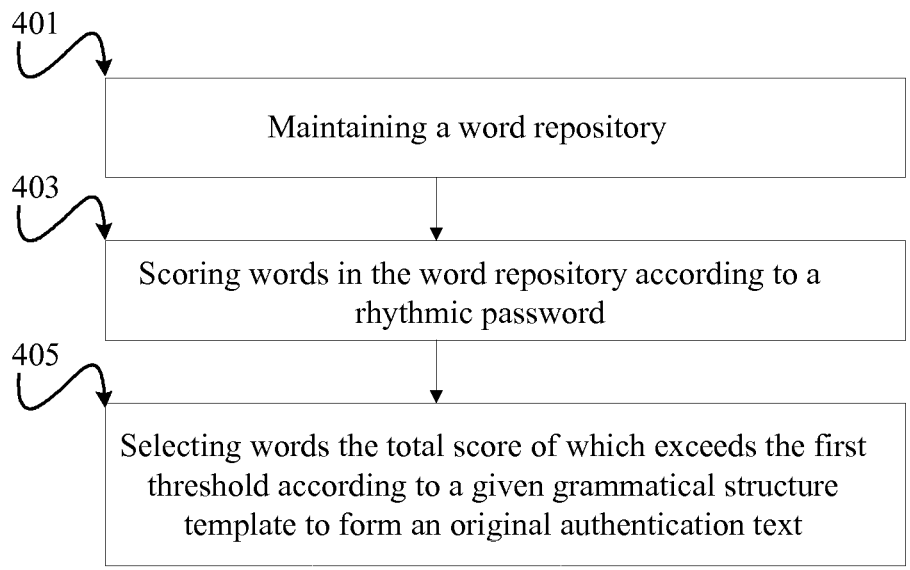
FIG. 4 illustrates a flow diagram of a method for generating an original authentication text according to an embodiment of the present invention.

FIG. 4 illustrates a flow diagram of a method for generating an original authentication text according to an embodiment of the present invention. In step 401, a word repository (e.g., a word repository with 1000 words) is maintained. The work repository can be stored in a data structure of any format, such as a list, a database, etc.

In step 403, words in the word repository are scored according to a rhythmic password to indicate the probabilities of the adjacent text units in the words appearing in the rhythmic password. For each user, each word in the word repository is scored. For example, for the word "desk" in the word repository, if the rhythmic password of the user has the value of r[d][e] and the value of r[e][s] stored therein, and has no value of r[e][s], the score of the word "desk" is 2:3 or 0.67. Of course, according to an embodiment of the present invention, the above scoring process can be performed when the computer is idle, and can not necessarily be performed temporarily whenever a user requests an authentication password. Further, according to an embodiment of the present invention, whenever a new time interval of adjacent text units is stored or an existing time interval of adjacent text units is updated in the rhythmic password, the score of the related word in the word repository can be updated.

In step 405, words the total score of which exceeds the first threshold (e.g., 60%) are selected according to a given grammatical structure template to form an original authentication text, wherein the grammatical structure template can be, for example, noun+verb+noun or noun+verb+adverb, etc.

Of course, the present invention has no limitation as to the grammatical structure template, rather in the present invention, any other grammatical structure template can be adopted. Further, more grammatical limitations, such as tense etc., can be added to the grammatical structure template. Then, according to the given grammatical structure template, words complying with specific part of speech are selected to form a sentence, on the condition that the total score of the selected words must exceed the first threshold (e.g., 60%). That is to say, in the sentence selected to be the original authentication text there should be a number of pairs of adjacent text units exceeding the first threshold that are recorded in the rhythmic password.

For example, the user has provided correctly the input authentication text "a bird is flying away from the tree" when inputting according to the original training text, and in the authentication phase, the original authentication text generated according to step 405 is "a boy is crying", wherein in the 14 pairs of adjacent text units in the original authentication text there are 64% pairs of text units appearing in the rhythmic password. Therefore, the original authentication text "a boy is crying" satisfies the requirement of the first threshold.

Using a grammatical structure template to limit an original authentication text can normalize the grammar of the original authentication text, but this can not necessarily guarantee that the semantics of the original authentication text comply with common logics. For example, the generated original authentication text can be "a cat is flying".

Compared with requesting the user to type according to irregular text units, if the grammar of the original authentication text complies with some specification, and the words in the original authentication text are correctly spelled words, the biometric factors reflected in the user typing will be more conspicuous.

According to an embodiment of the present invention, if the user is authenticated successfully with the rhythmic password, the time intervals between adjacent text units in the input authentication text can be used to update the rhythmic password of the user. As in the above example, if in the input authentication text provided correctly by the user, there are a number of pairs of adjacent text units exceeding the first threshold that have appeared in the rhythmic password, while the other pairs of adjacent text units have not appeared in the rhythmic password, for example, there are 64% pairs of adjacent text units that have appeared in the rhythmic password, while there are 36% pairs of adjacent text units that have not appeared in the rhythmic password, then, the rhythmic characteristic values of these 36% pairs of adjacent text units can be additionally recorded in the rhythmic password.

According to this embodiment, the user is not required to provide a large amount of input training texts initially, rather the rhythmic password data can be enriched continually during the process of authentication with the rhythmic password, thus ensuring good user experience while at the same time enhancing the security of password authentication, and saving the time of typing a large amount of input authentication texts by the user. For the 64% pairs of adjacent text units that have appeared in the rhythmic password, the time intervals between these 64% pairs of adjacent text units can further be updated into the existing rhythmic password (e.g., averaging the new time intervals with the existing time intervals, and then storing it at the corresponding locations in the rhythmic password), thus further updating the rhythmic password.

Figure 5:
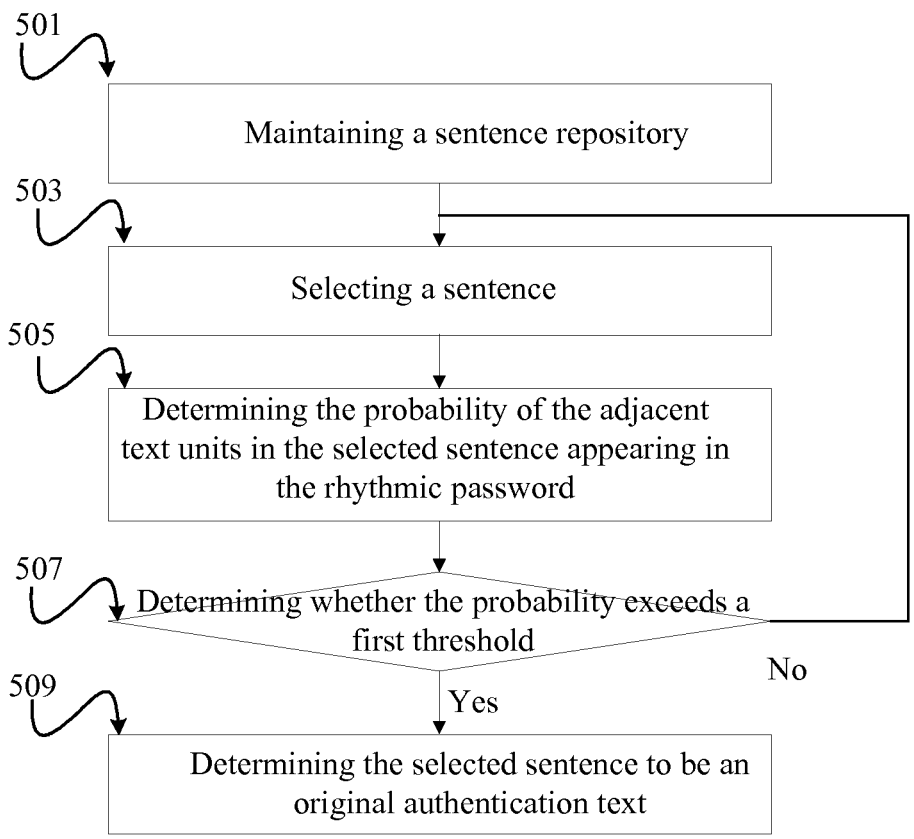
FIG. 5 illustrates a flow diagram of a method for creating an original authentication text according to another embodiment of the present invention.

FIG. 5 illustrates a flow diagram of a method for generating an original authentication text according to another embodiment of the present invention. In step 501, a sentence repository 501 (e.g., a repository with 600 sentences) is maintained. The sentence repository can be stored in a data structure of any format, such as a list, a database, etc. Of course, the sentence in the sentence repository can be a sentence with a complete grammatical structure, or a combination of multiple sentences each with a complete grammatical structure, or even a sentence with an incomplete grammatical structure.

In step 503, a sentence is selected. The selection in step 503 can be made randomly, or made according to certain order, such as according to the order of the times of the sentences being entered into the sentence repository, or according to the order of the letters in the sentences.

In step 505, the probability of the adjacent text units in the selected sentence appearing in the rhythmic password is determined. In step 507, it is determined whether the probability exceeds a first threshold (e.g., 60%). When it exceeds the first threshold, in step 509 the selected sentence is determined to be an original authentication text; when it does not exceeds the first threshold, the method returns to step 503 to select a next sentence.

Compared with the embodiment of FIG. 4, in which the original authentication text is generated in a relatively active manner, in the embodiment of FIG. 5, the original authentication text is generated in a passive testing manner. In comparison, the embodiment of FIG. 4 can generate the original authentication text faster, but with a higher computation cost, while the embodiment of FIG. 5 has a lower computation cost, but can generate the original authentication text with a rather slower speed. Thus, in practice, the different manners can be used according to the requirements of different application scenarios. Of course, the present invention can also adopt other manners of generating the original authentication text.

In the following, the system of the present invention is described, and since the system of the present invention essentially corresponds to the method described above, repetitive contents are not described in detail below.

Figure 6:
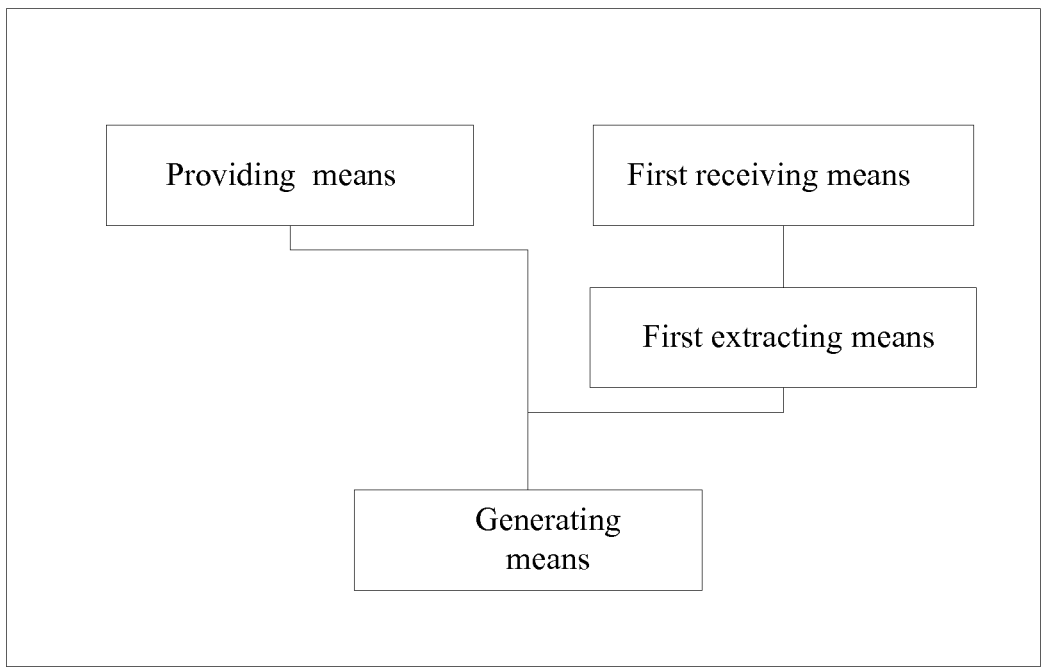
FIG. 6 illustrates a block diagram of a system for creating a rhythmic password according to an embodiment of the present invention.

FIG. 6 illustrates a block diagram of a system for creating a rhythmic password according to an embodiment of the present invention. The system in FIG. 6 comprises providing means, first receiving means, first extracting means and generating means, wherein the providing means is configured to provide an original training text to a user; the first receiving means is configured to receive an input training text provided by the user according to the original training text; the first extracting means is configured to extract rhythmic characteristic values between adjacent text units of the input training text; and the generating means is configured to generate a rhythmic password of the user based on the extracted rhythmic characteristic values between adjacent text units.

According to an embodiment of the present invention, the generating means is further configured to record the time intervals between adjacent characters in the input training text in a table, as the rhythmic password of the user.

According to an embodiment of the present invention, the generating means is further configured to: match the input training text and the original training text; and only take the rhythmic characteristic values of matched adjacent text units as the rhythmic password of the user.

According to an embodiment of the present invention, the rhythmic password is stored in a table, and at least one row or column of the table stores the combination of at least two text units.

According to an embodiment of the present invention, the comparison means is further configured to match the input authentication text with the original authentication text to determine the adjacent text units in the input authentication text that are correctly provided, and only when the number of correctly provided adjacent text units in the input authentication text exceeds a second threshold, to perform the comparison between the rhythmic characteristic values of the adjacent text units and the rhythmic password of the user.

Figure 7:
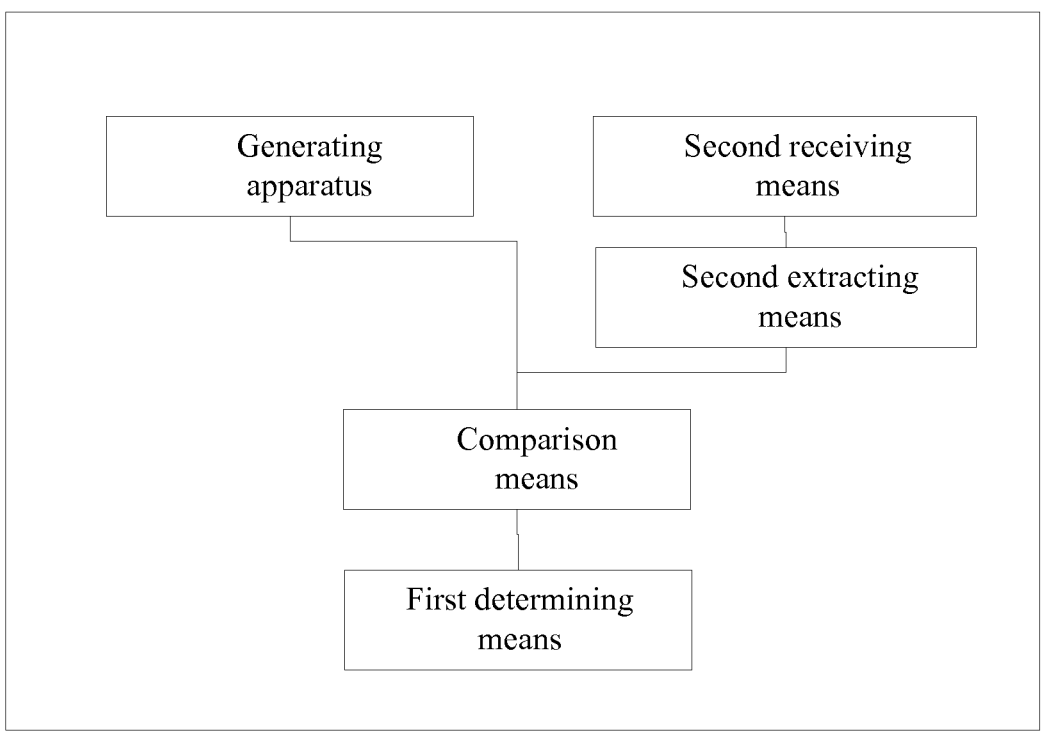
FIG. 7 illustrates a block diagram of a system for authenticating based on a rhythmic password according to an embodiment of the present invention.

FIG. 7 illustrates a block diagram of a system for authenticating based on a rhythmic password according to an embodiment of the present invention. The system comprises a generating apparatus, second receiving means, second extracting means, comparison means and first determining means, where the generating apparatus is configured to generate an original authentication text for a user; the second receiving means is configured to receive an input authentication text provided by the user according to the original authentication text; the second extracting means is configured to extract rhythmic characteristic values between adjacent text units in the input authentication text; the comparing means is configured to compare the extracted rhythmic characteristic values between adjacent text units with a rhythmic password of the user; and the first determining means is configured to determine whether the user is authenticated successfully with the rhythmic password according to the comparison result.

According to an embodiment of the present invention, the rhythmic characteristic values in the system in FIG. 7 are the time intervals between the adjacent text units.

According to an embodiment of the present invention, in the original authentication text generated in the system in FIG. 7, there are a number of adjacent text units exceeding a first threshold that are recorded in the rhythmic password.

According to an embodiment of the present invention, the comparison means in the system in FIG. 7 is further configured to: calculate the differences between the time intervals between adjacent text units in the input authentication text and the time intervals of the adjacent text units recorded in the rhythmic password.

According to an embodiment of the present invention, the system in FIG. 7 further comprises an updating means configured to, in response the user having been successfully authenticated with the rhythmic password, update the rhythmic password of the user with the rhythmic characteristic values between adjacent text units in the input authentication text.

Figure 8:
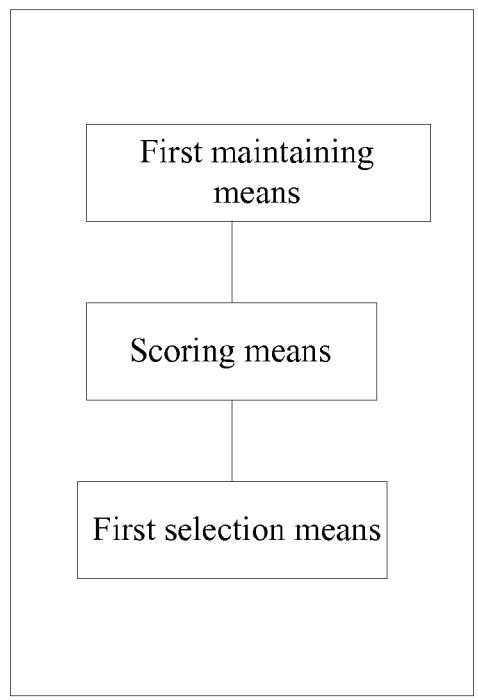
FIG. 8 illustrates a block diagram of an apparatus for generating an original authentication text according to an embodiment of the present invention.

FIG. 8 illustrates a block diagram of an apparatus for generating an original authentication text according to an embodiment of the present invention. The apparatus for generating an original authentication text comprises first maintaining means, scoring means and first selection means, wherein the first maintaining means is configured to maintain a word repository, the scoring means is configured to score the words in the word repository according to the rhythmic password to indicate the probabilities of the adjacent text units in the words appearing in the rhythmic password; and the first selection means is configured to select words the total score of which exceeds a first threshold according to a given grammatical structure template to form an original authentication text.

Figure 9:
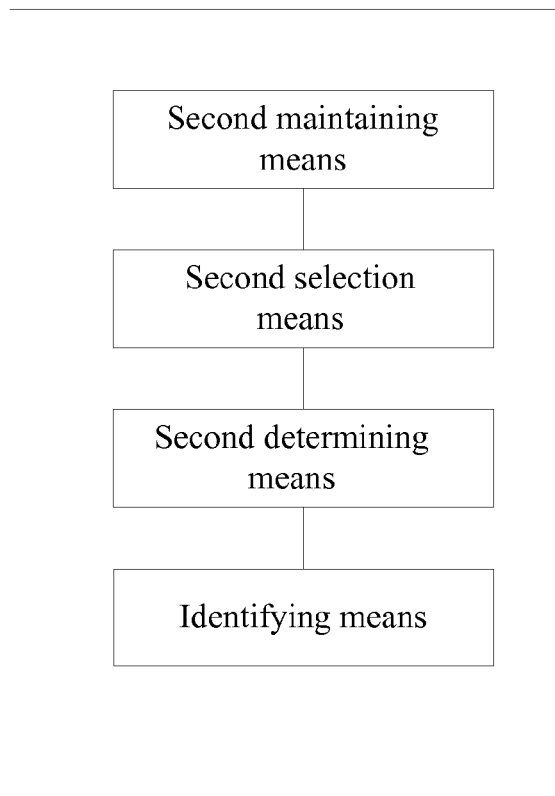
FIG. 9 illustrates a block diagram of an apparatus for generating an original authentication text according to another embodiment of the present invention.

FIG. 9 illustrates a block diagram of an apparatus for generating an original authentication text according to another embodiment of the present invention. The apparatus for generating an original authentication text comprises second maintaining means, second selection means, second determining means, and identifying means, wherein the second maintaining means is configured to maintain a sentence repository; the second selection means is configured to select a sentence; the second determining means is configured to determine the probability of the adjacent text units in the selected sentence appearing in the rhythmic password, and to determine whether the probability exceeds a first threshold (e.g., 60%); and the identifying means is configured to identify the selected sentence as an original authentication text in the case that the probability exceeds the first threshold, and the second selection means is further configured to proceed to select a next sentence in the case that the probability does not exceed the first threshold.

The present invention can be used as a standalone authentication solution (e.g., using a user ID and a rhythmic password together), or in conjunction with a conventional authentication solution (e.g., an authentication solution using a text password).

Embodiments of the present invention have at least one of the following advantages: (1) Enhanced security of passwords. The present invention utilizes the biometric factors of the user to perform authentication with a rhythmic password, instead of using a fixed rhythm to perform authentication. In particular, according to an embodiment of the present invention, since the user is provided with a different original authentication text each time he is to be authenticated, the input text that the user is required to input each time he is to be authenticated is different, even others have peeked at the user inputting the password, they cannot remember the biometric factors implied in his typing pattern; and even others have peeped at the original authentication text provided to the user, they can hardly grasp the typing rhythm of the user, therefore they can hardly break the user's password. (2) Saving the user's cost of memorizing a password. In the prior art, the user is required to memorize passwords set by himself. However, according to an embodiment of the present invention, the user can not memorize passwords or can memorize less passwords set by himself, because the system each time will provide a different original authentication text for the user to type in. (3) Saving the user's cost of changing a password. Many applications require a user to change the password periodically to enhance the security. According to an embodiment of the present invention, since the user is provided with a different original authentication text in each time of authentication, the original authentication text per se typed in by him is different each time. (4) Flexibility in password inputting. According to an embodiment of the present invention, the input authentication text typed in by the user is not required to match the original authentication text precisely, and the system can automatically identify miss hits, wrong hits, etc., and automatically filter them out, thus allowing certain error tolerance. (5) Automatically improving the rhythmic password by using the time intervals between adjacent text units in the input authentication text to update the rhythmic password of the used, such that, for example, the user is not required to provide a large amount of input training texts, rather, the contents of the rhythmic password can be expanded and improved in each authentication.

Embodiments of the present invention can provide many advantages, including those listed in the summary of the invention and that can be deduced from the technical solutions per se. However, whether one embodiment possesses all the advantages or not, and whether such advantages are deemed as representing substantial improvement or not, do not constitute limitation to the present invention. In the meantime, the embodiments described above are only for the purpose of illustration, and those of ordinary skill in the art can make various variations and modifications to the above embodiments without departing from the substance of the present invention. The scope of the present invention is totally defined by the appended claims.

We claim:

1. A method for creating a rhythmic password, comprising:
   providing an original training text to a training text user;
   receiving an input training text provided by the training text user according to the original training text;
   extracting first rhythmic characteristic values between adjacent text units of the input training text;
   generating a rhythmic password of the training text user based on the extracted rhythmic characteristic values between adjacent text units;
   generating an original authentication text for a user to be authenticated;
   receiving an input authentication text provided by the user to be authenticated according to the original authentication text;
   extracting second rhythmic characteristic values between adjacent text units in the input authentication text;
   comparing the extracted second rhythmic characteristic values between adjacent text units with the rhythmic password of the training text user by calculating a difference between: (i) a sum of the time intervals of at least two successive pairs of adjacent text units in the input authentication text; and (ii) a sum of the time intervals of corresponding at least two pairs of adjacent text units recorded in the rhythmic password, the comparing including:
   computing an average error value as a function of a count representing a number of pairs of adjacent text units in the input authentication text, a time interval between adjacent text units in the input authentication text, and a time interval between adjacent text units in the rhythmic password; and
   comparing the computed average error value with a threshold; and
   determining that the user to be authenticated is authenticated successfully if the computed average error value is less than the threshold;
   wherein the rhythmic password is stored in a table having a plurality of rows and a plurality of columns, wherein an intersection formed by a given one of the rows and a given one of the columns stores therein time interval data, wherein the given one of the rows corresponds to at least a first text unit and a second text unit, wherein the given one of the columns corresponds to at least a third text unit and a fourth text unit, and wherein each of the first text unit, the second text unit, the third text unit and the fourth text unit are distinct from one another,
   wherein the time interval data stored at the intersection is the time interval of adjacent text units when any one of the first text unit and the second text unit is adjacent with any one of the third text unit and the fourth text unit.

2. The method according to claim 1, wherein the first rhythmic characteristic values between adjacent text units are the time intervals between the adjacent text units of the input training text.

3. The method according to claim 1, wherein the generating a rhythmic password of the training text user based on the extracted rhythmic characteristic values between adjacent text units further comprises:
   matching the input training text and the original training text; and
   taking only the first rhythmic characteristic values of matched adjacent text units as the rhythmic password of the training text user.

4. A method for authenticating based on a rhythmic password, comprising:
   generating an original authentication text for a user to be authenticated;
   receiving an input authentication text provided by the user to be authenticated according to the original authentication text;
   extracting rhythmic characteristic values between adjacent text units in the input authentication text;
   comparing the extracted rhythmic characteristic values between adjacent text units with a rhythmic password of a training text user by calculating a difference between: (i) a sum of the time intervals of at least two successive pairs of adjacent text units in the input authentication text; and (ii) a sum of the time intervals of corresponding at least two pairs of adjacent text units recorded in the rhythmic password, the comparing including:
   computing an average error value of a function of a count representing a number of pairs of adjacent text units in the input authentication text, a time interval between adjacent text units in the input authentication text, and a time interval between adjacent text units in the rhythmic password; and
   comparing the computed average error value with a threshold; and
   determining that the user to be authenticated is authenticated successfully if the computed average error value is less than the threshold;
   wherein the rhythmic password is stored in a table having a plurality of rows and a plurality of columns, wherein an intersection formed by a given one of the rows and a given one of the columns stores therein time interval data, wherein the given one of the rows corresponds to at least a first text unit and a second text unit, wherein the given one of the columns corresponds to at least a third text unit and a fourth text unit, and wherein each of the first text unit, the second text unit, the third text unit and the fourth text unit are distinct from one another, wherein the time interval data stored at the intersection is the time interval of adjacent text units when any one of the first text unit and the second text unit is adjacent with any one of the third text unit and the fourth text unit.

5. The method according to claim 4, wherein the rhythmic characteristic values are the time intervals between the adjacent text units, and the time interval between at least two text units is recorded as the rhythmic password.

6. The method according to claim 4, wherein in the generated original authentication text, there are a number of adjacent text units exceeding a first threshold that are recorded in the rhythmic password.

7. The method according to claim 4, wherein the generating an original authentication text further comprises:
    maintaining a word repository;
    scoring the words in the word repository according to the rhythmic password to indicate the probabilities of the adjacent text units in the words appearing in the rhythmic password; and
    selecting words the total score of which exceeds a first threshold according to a given grammatical structure template to form an original authentication text.

8. The method according to claim 4, wherein the comparing the extracted rhythmic characteristic values between adjacent text units with a rhythmic password of the training text user further comprises:
    matching the input authentication text with the original authentication text to determine the adjacent text units in the input authentication text that are correctly provided; and
    only when the number of the correctly provided adjacent text units in the input authentication text exceeds a second threshold, performing the comparison between the rhythmic characteristic values between the adjacent text units and the rhythmic password of the user.

9. The method according to claim 4, further comprising:
    in response to the user to be authenticated having been successfully authenticated with the rhythmic password, updating the rhythmic password of the training text user with the rhythmic characteristic values between adjacent text units in the input authentication text.

10. A system for creating a rhythmic password, comprising:
    a memory device;
    a processor device connected to the memory device, wherein the processor device is configured to:
    provide an original training text to a training text user;
    receive an input training text provided by the training text user according to the original training text;
    extract first rhythmic characteristic values between adjacent text units of the input training text;
    generate a rhythmic password of the training text user based on the extracted rhythmic characteristic values between adjacent text units;
    generate an original authentication text for a user to be authenticated;
    receive an input authentication text provided by the user to be authenticated according to the original authentication text;
    extract second rhythmic characteristic values between adjacent text units in the input authentication text; and
    compare the second extracted rhythmic characteristic values between adjacent text units with the rhythmic password of the training text user by calculating a difference between: (i) a sum of the time intervals of at least two successive pairs of adjacent text units in the input authentication text; and (ii) a sum of the time intervals of corresponding at least two pairs of adjacent text units recorded in the rhythmic password, wherein to compare, the processor device is further configured to:
        compute an average error value of a function of a count representing a number of pairs of adjacent text units in the input authentication text, a time interval between adjacent text units in the input authentication text, and a time interval between adjacent text units in the rhythmic password; and
        compare the computed average error value with a threshold, and
    determine that the user to be authenticated is authenticated successfully if the computed average error value is less than the threshold;
    wherein the rhythmic password is stored in a table having a plurality of rows and a plurality of columns, wherein an intersection formed by a given one of the rows and a given one of the columns stores therein time interval data, wherein the given one of the rows corresponds to at least a first text unit and a second text unit, wherein the given one of the columns corresponds to at least a third text unit and a fourth text unit, and wherein each of the first text unit, the second text unit, the third text unit and the fourth text unit are distinct from one another,
    wherein the time interval data stored at the intersection is the time interval of adjacent text units when any one of the first text unit and the second text unit is adjacent with any one of the third text unit and the fourth text unit.

11. The system according to claim 10, wherein the first rhythmic characteristic values between adjacent text units are the time intervals between the adjacent text units of the input training text, and the time interval between at least two text units of the input training text is recorded as the rhythmic password.

12. The system according to claim 10, wherein the processor device is further configured to:
    match the input training text and the original training text; and
    only take the rhythmic characteristic values of matched adjacent text units as the rhythmic password of the training text user.

13. A system for authenticating based on a rhythmic password, comprising:
    a memory device;
    a processor device connected to the memory device, wherein the processor device is configured to:
    generate an original authentication text for a user to be authenticated;
    receive an input authentication text provided by the user to be authenticated according to the original authentication text;
    extract rhythmic characteristic values between adjacent text units in the input authentication text;

compare the extracted rhythmic characteristic values between adjacent text units with a rhythmic password of a training text user by calculating a difference between: (i) a sum of the time intervals of at least two successive pairs of adjacent text units in the input authentication text; and (ii) a sum of the time intervals of corresponding at least two pairs of adjacent text units recorded in the rhythmic password, wherein to compare, the processor device is further configured to:
  compute an average error value as a function of a count representing a number of pairs of adjacent text units in the input authentication text, a time interval between adjacent text units in the input authentication text, and a time interval between adjacent text units in the rhythmic password; and
  compare the computed average error value with a threshold; and
determine that the user to be authenticated is authenticated successfully if the computed average error value is less than the threshold;
wherein the rhythmic password is stored in a table having a plurality of rows and a plurality of columns, wherein an intersection formed by a given one of the rows and a given one of the columns stores therein time interval data, wherein the given one of the rows corresponds to at least a first text unit and a second text unit, wherein the given one of the columns corresponds to at least a third text unit and a fourth text unit, and wherein each of the first text unit, the second text unit, the third text unit and the fourth text unit are distinct from one another,
wherein the time interval data stored at the intersection is the time interval of adjacent text units when any one of the first text unit and the second text unit is adjacent with any one of the third text unit and the fourth text unit.

14. The system according to claim 13, wherein the rhythmic characteristic values are the time intervals between the adjacent text units in the input authentication text.

15. The system according to claim 13, wherein in the generated original authentication text, there are a number of adjacent text units exceeding a first threshold that are recorded in the rhythmic password.

16. The system according to claim 13, wherein the processor device is further configured to:
  maintain a word repository;
  score the words in the word repository according to the rhythmic password to indicate the probabilities of the adjacent text units in the words appearing in the rhythmic password; and
  select words the total score of which exceeds a first threshold according to a given grammatical structure template to form an original authentication text.

17. The system according to claim 13, wherein the processor device is further configured to match the input authentication text with the original authentication text to determine the adjacent text units in the input authentication text that are correctly provided, and only when the number of the correctly provided adjacent text units in the input authentication text exceeds a second threshold, to perform the comparison between the rhythmic characteristic values between the adjacent text units and the rhythmic password of the training text user.

18. The system according to claim 13,
  wherein the processor device is configured to, in response to the user to be authenticated having been successfully authenticated with the rhythmic password, update the rhythmic password of the training text user with the rhythmic characteristic values between adjacent text units in the input authentication text.

* * * * *